United States Patent [19]

Solell

[11] 4,145,885
[45] Mar. 27, 1979

[54] WAVE MOTOR

[76] Inventor: Yedidia Solell, Rav-Ashi 1, Tel Aviv, Israel

[21] Appl. No.: 854,226

[22] Filed: Nov. 23, 1977

[30] Foreign Application Priority Data

Sep. 23, 1977 [IL] Israel ................................. 52982
Oct. 21, 1977 [IL] Israel ................................. 53179

[51] Int. Cl.² .......................................... F03B 13/12
[52] U.S. Cl. ...................................... 60/504; 60/505; 60/507; 60/398; 290/53
[58] Field of Search ................ 60/398, 495, 497, 502, 60/504, 505, 507, 716; 61/20; 185/32, 33; 290/42, 53; 417/100, 330, 331, 337

[56] References Cited

U.S. PATENT DOCUMENTS

| 366,768 | 7/1887 | Elias | 61/20 X |
| 415,812 | 11/1889 | Dowe | 60/504 |
| 971,343 | 9/1910 | Barr | 60/497 |
| 1,292,303 | 1/1919 | Garwood | 60/504 |

Primary Examiner—Edgar W. Geoghegan
Attorney, Agent, or Firm—Benjamin J. Barish

[57] ABSTRACT

A wave motor is described comprising a float, a displaceable member coupled to the float so as to be displaced by the ascent and descent of the float, a pair of shafts, and a transmission including a pair of one-way clutches coupling the displaceable member to the shafts to rotate one in one direction during the ascent of the float and to rotate the other in the opposite direction during the descent of the float. In one described embodiment, the displaceable member is a wheel which is partially rotated in opposite directions by the ascent and descent of the float; and in a second described embodiment, the displaceable member is a rack which is moved upwardly by the ascent of the float and downwardly by its descent.

7 Claims, 6 Drawing Figures

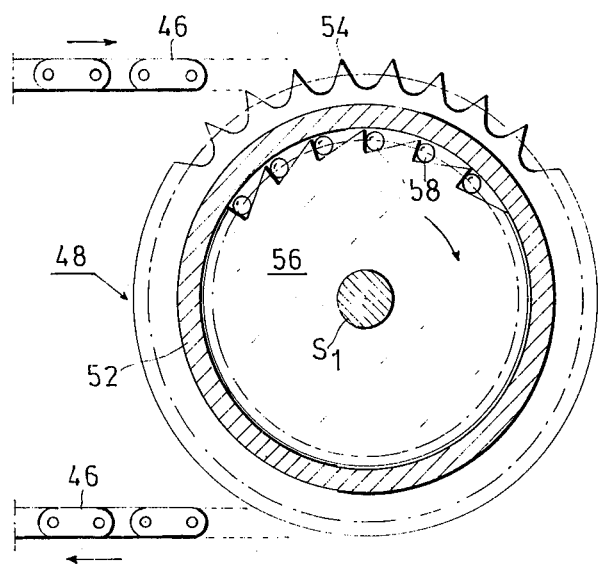
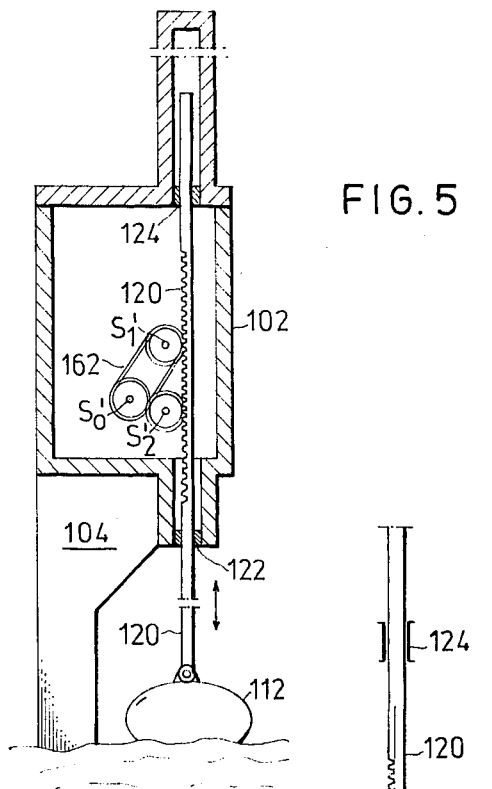
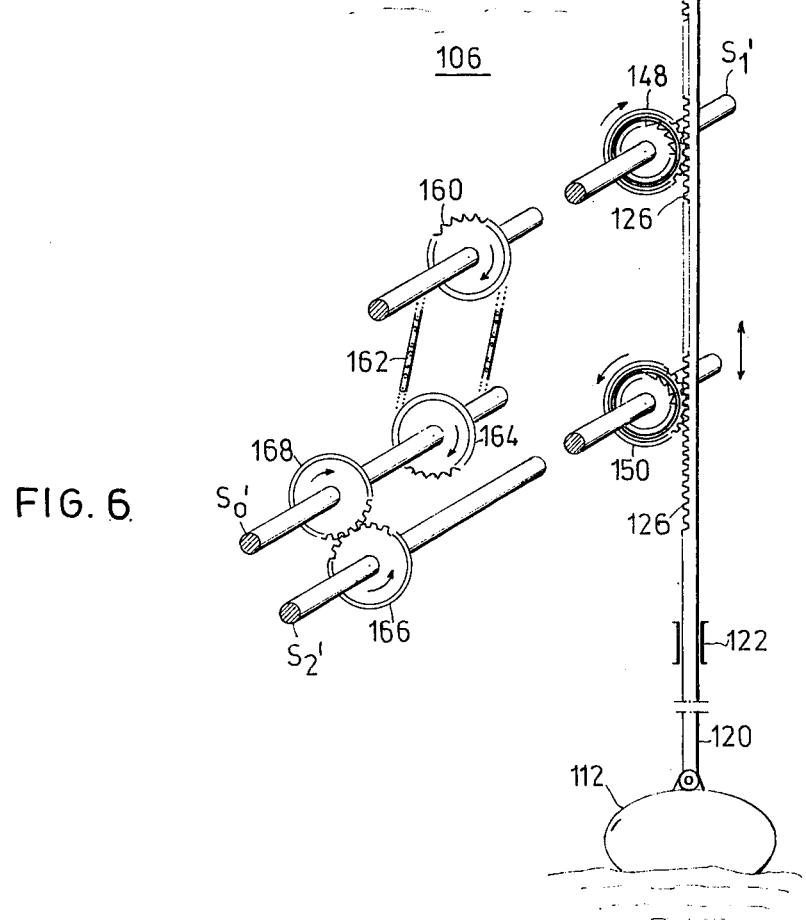
FIG. 4
FIG. 5
FIG. 6

WAVE MOTOR

BACKGROUND OF THE INVENTION

The present invention relates to wave motors, namely to motors for converting energy from sea waves to mechanical work.

The energy in the sea constitutes a vast reservoir which has remained largely untapped to the present time. Many types of wave motors have been proposed, but as a rule, they have not become economically feasible mainly because of the large initial cost involved in their construction and installation compared to the amount of energy they are capable of extracting from the sea.

An object of the present invention is to provide a wave motor having a relatively simple design and capable of extracting substantial amounts of energy from the sea.

SUMMARY OF THE INVENTION

According to a broad aspect of the invention, there is provided a wave motor comprising: a float; a displaceable member coupled to the float so as to be displaced through a forward stroke by the ascent of the float, and through a return stroke by the descent of the float; a pair of shafts; and a transmission coupling the displaceable member to the pair of shafts; the transmission including a first one-way clutch coupling the displaceable member to one shaft to rotate same in one direction during the displacement of said member through its forward stroke, and a second one-way clutch coupling the displaceable member to the other shaft to rotate same in the opposite direction during the displacement of the member through its return stroke.

In one preferred embodiment of the invention described below, the displaceable member is a wheel coupled to the float by linkage which partially rotates the wheel in one direction during the ascent of the float, and partially rotates the wheel in the opposite direction during the descent of the float. More particularly, in this embodiment, the wheel and the one-way clutches include teeth, the transmission including a closed-loop chain trained around the teeth of the wheel and the one-way clutches.

In a second preferred embodiment described below, the displaceable member comprises a rack coupled to the float so as to be displaced through an upward stroke by the ascent of the float and through a downward stroke by the descent of the float; in addition, the transmission coupling the float to the pair of shafts comprises teeth formed on the rack meshing with gears coupled by the one-way clutches to the pair of shafts to rotate one shaft in one direction during the upward stroke of the rack, and to rotate the other shaft in the opposite direction during the downward stroke of the rack.

In both described embodiments, there are a plurality of drive units each including one of the floats, displaceable members, and transmissions, all coupled to the pair of shafts for driving same in opposite directions.

Further features and advantages of the invention will be apparent from the description below.

BRIEF DESCRIPTION OF THE DRAWINGS

The invention is herein described, somewhat diagramatically and by way of example only, with reference to the accompanying drawings, wherein:

FIG. 4 illustrates one form of one-way clutch that may be used in the wave motor of FIGS. 1-3;

FIG. 5 is a vertical sectional view of another wave motor constructed in accordance with the invention; and FIG. 6 is a three-dimensional view illustrating the main elements in one of the drive units in the wave motor of FIG. 5.

DESCRIPTION OF THE PREFERRED EMBODIMENTS

Figure 1:
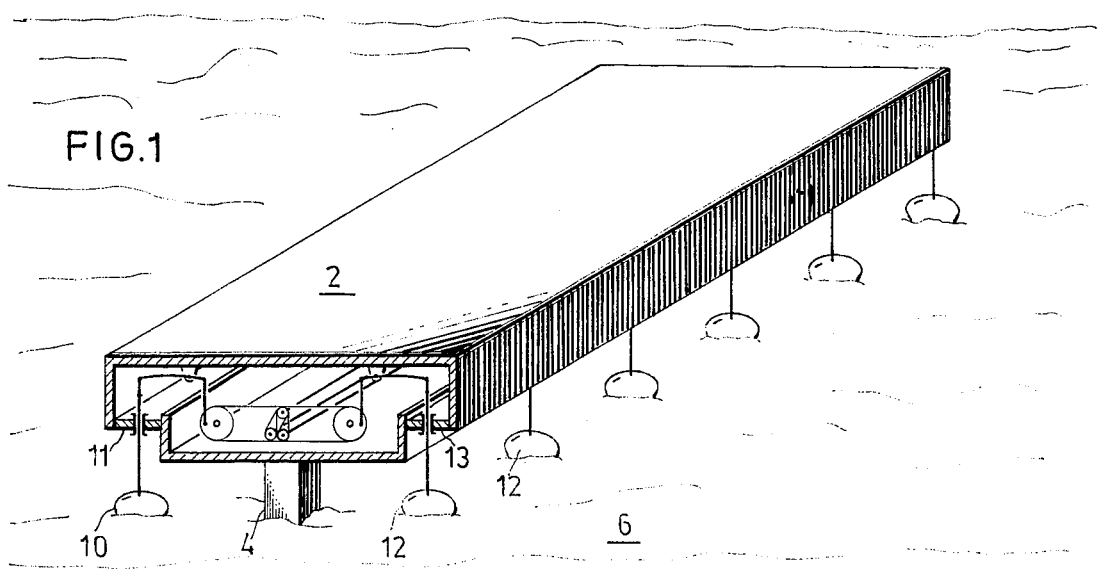
FIG. 1 is a three-dimensional view illustrating one form of wave motor constructed in accordance with the invention.

The wave motor illustrated in the drawings comprises an elongated housing, generally designated 2, mounted by a plurality of columns 4 above a body of water 6 subject to waves. Housing 2 encloses a plurality of drive units each including a float 10 vertically movable with respect to an opening in the housing bottom wall 11 on one side of the mounting columns 4, and another float 12 vertically movable with respect to an opening in the bottom wall 13 on the other side of the mounting columns. Any desired number of such drive units could be provided lengthwise of housing 2, each drive unit including a pair of such floats 10, 12. Housing 2 is mounted over the body of water so as to extend lengthwise substantially perpendicular to the direction of propagation of the waves, whereby a wave will normally intercept one of the floats (e.g. the left float 10) in each of the drive units, and then will intercept the other float (e.g. the right float 12) in each drive unit.

Figure 2:
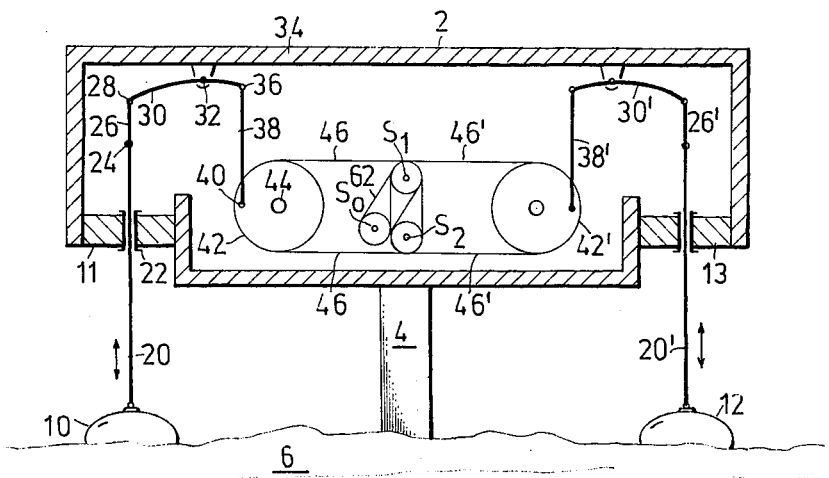
FIG. 2 is an end view of the wave motor of FIG. 1.
Figure 3:
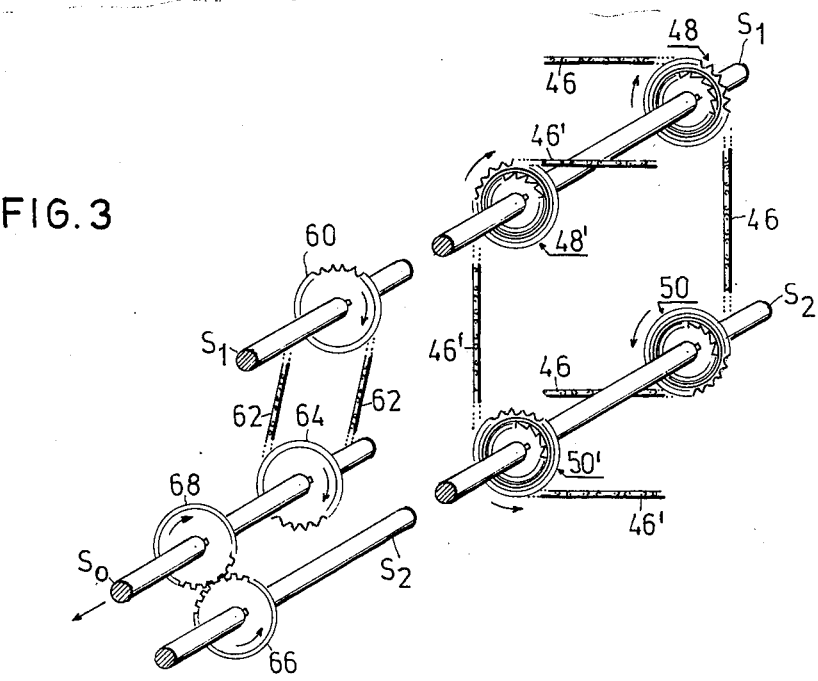
FIG. 3 is a three-dimensional view illustrating some of the elements in one of the drive units in the wave motor of FIG. 3.

As shown particularly in FIGS. 2 and 3, the wave motor comprises a pair of shafts S1, S2 extending the complete length of housing 2. Shaft S1 is coupled to all the drive units in the manner to be described below so as to be driven thereby in one direction (clockwise as shown in FIG. 3), whereas shaft S2 is coupled to all the drive units so as to be driven thereby in the opposite direction (counter-clockwise in FIG. 3). Both shafts S1 and S2 are in turn coupled to an output drive shaft S0 driven thereby in one direction, in this case in the same direction (clockwise) as shaft S1.

Thus, the mechanical power produced by the wave motor illustrated in the drawings is outputted through the output drive shaft S0. This shaft may be connected to an electrical generator, a pump, or any other device for utilizing or storing the mechanical energy produced by the wave motor.

The left float 10 of each drive unit is suspended from a rod 20 passing through a guide 22 formed in the lower housing wall 11. The upper end of rod 20 is hinged at 24 to one end of a short connecting rod 26, the opposite end of which is hinged at 28 to one end of a lever arm 30 pivotably mounted at 32 to the upper wall 34 of housing 2. The opposite end of lever arm 30 is hinged at 36 to a connecting rod 38 which in turn is hinged at 40 to an eccentric point on a toothed wheel 42 rotatable about its center axis 44. Wheel 42 thus serves as an oscillatable member which is coupled to its float 10 so as to be oscillated through a forward stroke (wherein the wheel partially rotates counter-clockwise) by the ascent of the float upon its interception of a wave crest, and through a return stroke (clockwise) by the descent of the float upon its interception of a wave trough.

Toothed wheel 42 is coupled by a transmission to the two shafts S1 and S2 by means of two one-way clutches effective to rotate shaft S1 in one direction (clockwise) during the forward stroke of wheel 42 upon the ascent of float 10, and to rotate shaft S2 in the opposite direction (counter-clockwise) during the return stroke upon the descent of float 10.

The foregoing transmission, best seen in FIG. 3, includes a closed-loop chain 46 trained about the outer teeth on wheel 42. Chain 46 is also trained about the outer teeth on a first one-way clutch 48 coupled to shaft S1, and on a second one-way clutch 50 coupled to shaft S2.

FIG. 4 illustrates, for purposes of example only, one form of one-way clutch which may be used, the construction shown in FIG. 4 being that for clutch 48. The clutch includes an outer body in the form of a ring 52 having teeth 54 receiving chain 46, and an inner body in the form of a ratchet 56 fixed to shaft S1 and coupled to the outer ring 52 by means of a plurality of balls 58. As known in such one-way clutches, the outer surface of the teeth of ratchet 56 is shaped such that when the outer ring 52 rotates in one direction (in this case clockwise), it tends to wedge balls 58 between it and the ratchet, thereby effecting a coupling between the two bodies; whereas when the outer ring rotates in the opposite direction (counter-clockwise), the balls effectively decouple the two bodies so that the outer ring 52 is free-running with respect to the ratchet.

One-way clutch 50 is of the same construction as clutch 48, except that it effects a coupling between chain 46 and shaft S2 during the opposite direction of movement of the chain (i.e., to rotate shaft S2 in the counter-clockwise direction), and is free-running in the clockwise direction.

It will thus be seen that the ascent of float 10 drives wheel 42 counter-clockwise so as to rotate shaft S2 counter-clockwise via engaged clutch 50, and the descent of the float drives wheel 42 clockwise so as to rotate shaft S1 clockwise via engaged clutch 48.

A similar oscillating wheel is provided with respect to the right float 12 to rotate shaft S1 (clockwise) during one stroke of the oscillating member, and to drive shaft S2 (counter-clockwise) during the outer stroke of the member. To facilitate understanding the drive mechanism cooperably with the right float 12, the same reference numerals have been used but containing a "prime" mark, for the corresponding elements described above with respect to the left float 10. Thus, the ascent of the right float 12 causes (via the rods 20', 26', lever 30', and connecting rod 38') the clockwise rotation of wheel 42', which in turn (via its chain 46', one-way clutch 48' coupled to shaft S1, and one-way clutch 50' coupled to shaft S2) rotates shaft S1 in the same direction (clockwise) as it is driven by the above-described wheel 42 (shaft S2 being decoupled from wheel 42' by the one-way clutch 50'); and the descent of the right float 12, causes the counter-clockwise rotation of wheel 42, which in turn rotates shaft S2 counter-clockwise (shaft S1 being decoupled by one-way clutch 48').

It will be appreciated that each drive unit within housing 2 includes a pair of floats corresponding to the left float 10 and the right float 12, each pair cooperating with a corresponding mechanism as described above to drive shaft S1 in one direction and shaft S2 in the opposite direction.

As also best seen in FIG. 3, the two shafts S1 and S2 are both coupled at their left ends to the output drive shaft S0 such as to rotate the latter shaft in one direction, clockwise in this case. For this purpose, the output shaft S0 is coupled to shaft S1 by a direct motion coupling including a gear 60 fixed to the end of shaft S1 and coupled by a chain 62 to another gear 64 fixed to the output shaft S0. Output shaft is coupled to shaft S2 by a motion-reversing coupling including a gear 66 fixed to the end of shaft S2 engaging a gear 68 fixed to the output shaft S0.

The wave motor illustrated in FIGS. 5 and 6 of the drawings comprises a housing, generally designated 102, which is elongated as in FIGS. 1–4 and is mounted by a plurality of columns 104 above the body of water 106. Housing 102 encloses a plurality of drive units each including a float 112 vertically movable in the upward direction with a wave crest and in a downward direction with a wave trough. This vertical movement of the float 112 drives a pair of shafts S1', S2' in opposite directions, which shafts in turn drive a single output shaft S0' in one direction, all as described with respect to FIGS. 1–4, particularly the shafts S1, S2, S0, respectively.

In the embodiment of FIGS. 5 and 6, however, a simplified arrangement is used for coupling the floats 112 to the two shafts S1', S2'.

Thus, each float 112 is coupled to a displaceable member in the form of a rack 120 such that the rack is displaced through an upward stroke by the ascent of the float and through a downward stroke by its descent. The vertical movement of rack 120 is guided by a pair of bearings 122, 124 within the housing 102. Rack 120 is formed with teeth 126 which mesh with the outer teeth of a first one-way clutch 148 and also with the outer teeth of a second one-way clutch 150.

The one-way clutches 148 and 150 correspond in structure and function to the one-way clutches 48 and 50 in the above-described FIGS. 1–4 and are effective, in the same manner as described there, to rotate shaft S1' in one direction during one stroke of the rack, and the other shaft S2' in the opposite direction during the other stroke of the rack. In the arrangement illustrated particularly in FIG. 6, it will be seen that the upward stroke of rack 120 will effect the counter-clockwise rotation of shaft S2', and the downstroke of the rack will effect the clockwise rotation of shaft S1'.

As also described above, the two shafts S1' and S2' are both coupled at their left ends to the output drive shaft S0' so as to rotate the latter shaft in one direction, clockwise in this case. This is effected by the provision of gear 160 fixed to the end of shaft S1' and coupled by chain 162 to another gear 164 fixed to the output shaft S0', and by gear 166 fixed to the end of shaft S2' engaging a gear 168 fixed to the output shaft S0', all as described above with respect to FIGS. 1–4 wherein the corresponding elements are numbered 60, 62, 64, 66 and 68, respectively.

While FIGS. 5 and 6 of the enclosed drawings illustrate only one drive unit driven by one float 112 in a body of water 106, it will be appreciated that the wave motor would include a plurality of such drive units, namely a plurality of floats arranged longitudinally of the wave motor housing, a plurality of racks each coupled to one of the floats, and a plurality of pairs of one-way clutches each pair coupling one of the racks to the pair of shafts S1', S2', as in the FIGS. 1–4 embodiment.

While the invention has been described with respect to two preferred embodiments for purposes of example, it will be appreciated that many variations can be made. For example, other mechanisms can be used for coupling the two oppositely-rotating shafts S1, S2 to the output drive shaft S0, and other one-way clutch mechanisms can be used. Many other variations, modifications and applications of the invention will be apparent.

What is claimed is:

1. A wave motor, comprising: a first float; a first displaceable member coupled to said float so as to be displaced through a forward stroke by the ascent of the float, and through a return stroke by the descent of the float; a pair of shafts; a first transmission coupling said displaceable member to said pair of shafts; said transmission including a first one-way clutch coupling the first displaceable member to one shaft to rotate same in one direction during the displacement of said member through its forward stroke, and a second one-way clutch coupling the first displaceable member to the other shaft to rotate same in the opposite direction during the displacement of the member through its return stroke; a second float; a second displaceable member coupled to said second float so as to be displaced by the ascent and descent thereof; and a second transmission including third and fourth one-way clutches coupling said second displaceable member to said pair of shafts such that the displacement of the second member rotates said one shaft in said one direction and said other shaft in said opposite direction.

2. A wave motor according to claim 1, wherein each of said displaceable members is a wheel coupled to its respective float so as to be partially rotated in one direction during the ascent of its respective float, and partially rotated in the opposite direction during the descent of its respective float, each of said wheels and one-way clutches including teeth, and each of said transmissions comprising a separate closed-loop chain trained around the teeth of its respective wheel and of its respective two one-way clutches.

3. A wave motor, comprising: a float; a displaceable member coupled to said float so as to be displaced through a forward stroke by the ascent of the float, and through a return stroke by the descent of the float; a pair of shafts; and a transmission coupling said displaceable member to said pair of shafts; said transmission including a first one-way clutch coupling the displaceable member to one shaft to rotate same in one direction during the displacement of said member through its forward stroke, and a second one-way clutch coupling the displaceable member to the other shaft to rotate same in the opposite direction during the displacement of the member through its return stroke; said pair of shafts being coupled to a common output drive shaft, one by a direct-motion coupling, and the other by a motion-reversing coupling, so that said common output drive shaft is driven in the same direction by said pair of oppositely rotating shafts.

4. A wave motor according to claim 3, wherein there are a plurality of drive units each including at least one of said floats, displaceable members, and transmissions, all coupled to said pair of shafts for driving same in opposite directions.

5. A wave motor, comprising: a float; a displaceable member coupled to said float so as to be displaced through a forward stroke by the ascent of the float, and through a return stroke by the descent of the float; a pair of shafts; and a transmission coupling said displaceable member to said pair of shafts; said transmission including a first one-way clutch coupling the displaceable member to one shaft to rotate same in one direction during the displacement of said member through its forward stroke, and a second one-way clutch coupling the displaceable member to the other shaft to rotate same in the opposite direction during the displacement of the member through its return stroke; said displaceable member comprising a rack coupled to said float so as to be displaced through an upward stroke by the ascent of the float and through a downward stroke by the descent of the float; said transmission coupling said float to said pair of shafts comprising teeth formed on said rack meshing with gears coupled by said one-way clutches to said pair of shafts to rotate one shaft in one direction during the upward stroke of the rack, and to rotate the other shaft in the opposite direction during the downward stroke of the rack.

6. A wave motor according to claim 5, wherein there are a plurality of drive units, each including a float, a rack, and a pair of one-way clutches, said pair of shafts being driven by all the floats each coupled to one of the racks, each rack being coupled to said pair of shafts via one pair of said one-way clutches.

7. A wave motor according to claim 6, further including a common housing for said plurality of drive units, the latter extending longitudinally of the housing, and mounting means mounting the housing above a body of water subject to waves with the float of each drive unit depending from opposite sides of the housing so as to be caused to ascend and descend by said waves.

* * * * *